(12) United States Patent
Wang et al.

(10) Patent No.: US 9,884,929 B2
(45) Date of Patent: Feb. 6, 2018

(54) ETHYLENE/ALPHA-OLEFIN INTERPOLYMER COMPOSITION

(71) Applicant: Dow Global Technologies LLC, Midland, MI (US)

(72) Inventors: Jian Wang, Freeport, TX (US); Mehmet Demirors, Freeport, TX (US); Amaia Bastero, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 69 days.

(21) Appl. No.: 14/888,018

(22) PCT Filed: Apr. 29, 2014

(86) PCT No.: PCT/US2014/035852
§ 371 (c)(1),
(2) Date: Oct. 29, 2015

(87) PCT Pub. No.: WO2014/179296
PCT Pub. Date: Nov. 6, 2014

(65) Prior Publication Data
US 2016/0060373 A1    Mar. 3, 2016

Related U.S. Application Data

(60) Provisional application No. 61/817,552, filed on Apr. 30, 2013.

(51) Int. Cl.
*C08F 8/00* (2006.01)
*C08F 210/16* (2006.01)
(Continued)

(52) U.S. Cl.
CPC ............ *C08F 210/16* (2013.01); *C08K 5/101* (2013.01); *C08K 5/13* (2013.01); *C08K 5/134* (2013.01);
(Continued)

(58) Field of Classification Search
CPC ...... C07F 17/00; C08F 10/00; C08F 23/0815; C08L 23/06
(Continued)

(56) References Cited

U.S. PATENT DOCUMENTS 7,250,473 B2    7/2007  Schramm et al.
7,411,023 B2    8/2008  Palmlof
(Continued)

OTHER PUBLICATIONS

PCT/US2014/035852, International Preliminary Report on Patentability dated Nov. 12, 2015.
(Continued)

*Primary Examiner* — Ellen S Wood

(57) ABSTRACT

An ethylene/alpha-olefin interpolymer composition suitable for pipe applications prepared via solution polymerization process, and pipes made therefrom. The ethylene/alpha-olefin interpolymer composition suitable for pipe applications according to the present invention comprises greater than 80 percent by weight of units derived from ethylene and 20 percent or less by weight of units derived from one or more alpha olefin co-monomers, wherein said ethylene/alpha-olefin interpolymer has a density in the range of from 0.925 to 0.935 g/cm$^3$, a melt index $I_2$ in the range of from 0.3 to 1.0 g/10 minutes, a melt flow ratio $I_{10}/I_2$ in the range of from 7.9 to 11, a melt strength in the range of from 3 to 10 cN, a DSC heat curve having a melting peak temperature in the range of from 120 to 130° C., a crystallinity in the range of from 50 to 70 percent, a 1% flexural modulus in the range from 350 to 600 MPa, and a zero shear viscosity ratio (ZSVR) in the range of from 2 to 10.

5 Claims, 1 Drawing Sheet

(51) Int. Cl.

| | | |
|---|---|---|
| *C08L 23/08* | (2006.01) | |
| *F16L 9/12* | (2006.01) | |
| *C08K 5/101* | (2006.01) | |
| *C08K 5/13* | (2006.01) | |
| *C08K 5/134* | (2006.01) | |
| *C08K 5/24* | (2006.01) | |
| *C08K 5/52* | (2006.01) | |
| *C08F 4/659* | (2006.01) | |
| *C08F 4/6592* | (2006.01) | |

(52) U.S. Cl.
CPC .................. *C08K 5/24* (2013.01); *C08K 5/52* (2013.01); *C08L 23/08* (2013.01); *C08L 23/0815* (2013.01); *F16L 9/12* (2013.01); *C08F 4/6592* (2013.01); *C08F 4/65908* (2013.01); *C08F 4/65912* (2013.01); *C08F 2420/02* (2013.01); *C08L 2203/18* (2013.01); *C08L 2205/025* (2013.01)

(58) Field of Classification Search
USPC ............................... 525/191; 428/34.1, 35.7
See application file for complete search history.

(56) References Cited

U.S. PATENT DOCUMENTS

| | | |
|---|---|---|
| 8,367,763 B2 | 2/2013 | Backman et al. |
| 8,450,426 B2 | 5/2013 | Palmlof et al. |
| 8,530,580 B2 | 9/2013 | Backman et al. |
| 2003/0088021 A1 | 5/2003 | Van Dun et al. |
| 2007/0273066 A1 | 11/2007 | Johansson et al. |
| 2010/0029883 A1 | 2/2010 | Krajete et al. |
| 2011/0108121 A1 | 5/2011 | Backman et al. |

OTHER PUBLICATIONS

PCT/US2014/035852, International Searching Report & Written Opinion dated Jul. 15, 2017.

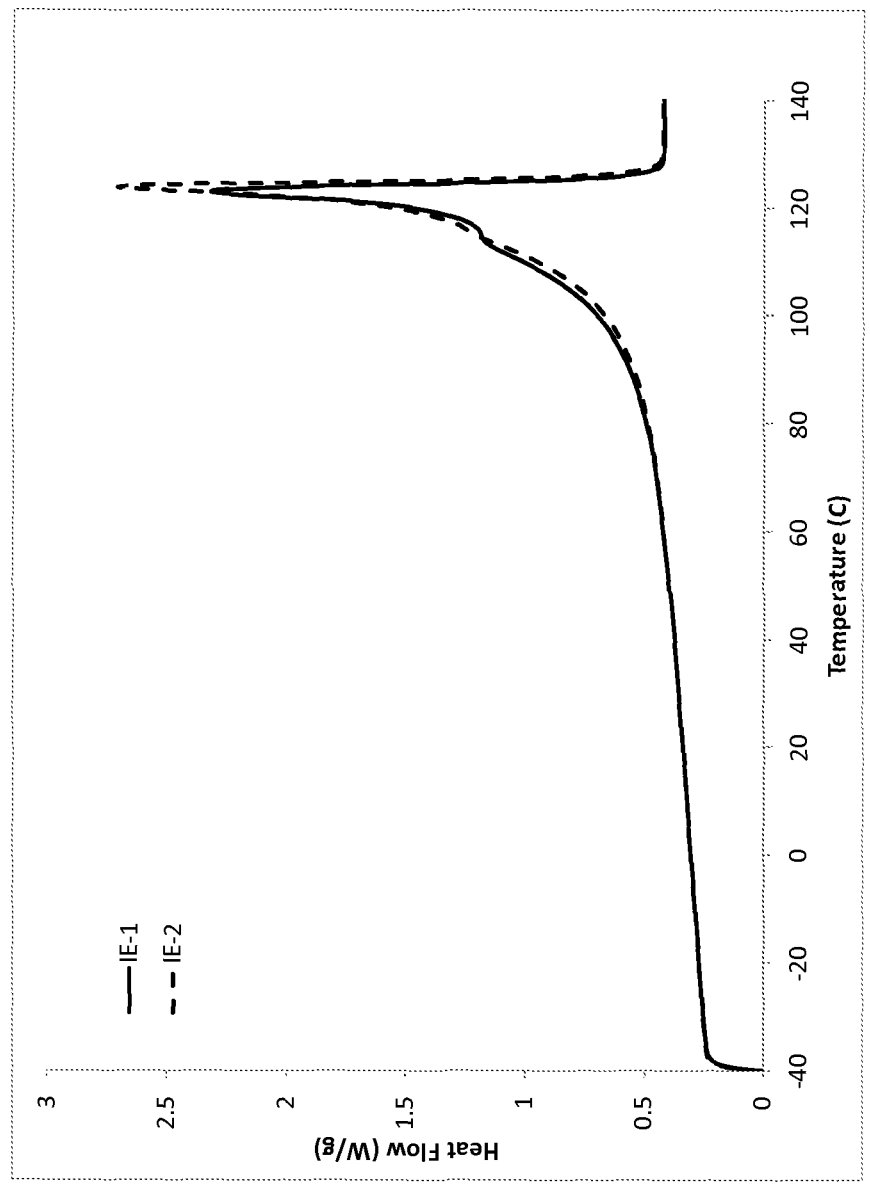

ETHYLENE/ALPHA-OLEFIN INTERPOLYMER COMPOSITION

FIELD OF INVENTION

The instant invention relates to an ethylene/alpha-olefin interpolymer composition suitable for pipe applications prepared via solution polymerization process, and pipes made therefrom.

BACKGROUND OF THE INVENTION

Polymeric materials, such as polyethylene, are used to form various pipes suitable for conveying hot and/or cold water under pressure for under-floor heating purposes. Such pipes are typically made via extrusion process forming monolayer and/or multilayer pipes. While the available polyethylene compositions may allow pipes to meet certain industry requirements, i.e. acceptable hoop stress resistance and acceptable slow crack growth resistance, the flexibility of such pipes requires further improvements thus facilitating the expeditious installations of such pipes.

Therefore, there is a need for a an ethylene/alpha-olefin interpolymer composition suitable for pipe applications, which meets acceptable hoop stress resistance and acceptable slow crack growth resistance while providing acceptable flexibility thus facilitating the expeditious installations of such pipes.

SUMMARY OF THE INVENTION

The instant invention provides an ethylene/alpha-olefin interpolymer composition suitable for pipe applications, and pipes made therefrom.

In one embodiment, the instant invention provides an ethylene/alpha-olefin interpolymer composition suitable for pipe applications comprising greater than 80 percent by weight of units derived from ethylene and 20 percent or less by weight of units derived from one or more alpha olefin co-monomers, wherein said ethylene/alpha-olefin interpolymer has a density in the range of from 0.925 to 0.935 g/cm$^3$, a melt index $I_2$ in the range of from 0.3 to 1.0 g/10 minutes, a melt flow ratio $I_{10}/I_2$ in the range of from 7.9 to 11, a melt strength in the range of from 3 to 10 cN, a DSC heat curve having a melting peak temperature in the range of from 120 to 130° C., a crystallinity in the range of from 50 to 70 percent, a 1% flexural modulus in the range from 350 to 600 MPa, and a zero shear viscosity ratio (ZSVR) in the range of from 2 to 10.

In another alternative embodiment, the instant invention further provides a pipe comprising the inventive ethylene/alpha-olefin interpolymer composition.

In an alternative embodiment, the instant invention further provides a pipe comprising the inventive ethylene/alpha-olefin interpolymer composition, wherein the pipe is a monolayer pipe In an alternative embodiment, the instant invention provides an ethylene/alpha-olefin interpolymer composition and/or a pipe, in accordance with any of the preceding embodiments, except that the ethylene/alpha-olefin interpolymer composition further comprises one or more additives.

In an alternative embodiment, the instant invention provides an ethylene/alpha-olefin interpolymer composition and/or a pipe, in accordance with any of the preceding embodiments, except that the ethylene/alpha-olefin interpolymer composition has a time to failure at 95° C. and 3.4 MPa of at least 1000 h determined according to ISO 1167.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 graphically depicts a DSC second heating trace for ethylene/alpha-olefin interpolymer compositions according to one or more embodiments shown and described herein.

DETAILED DESCRIPTION OF THE INVENTION

The instant invention provides an ethylene/alpha-olefin interpolymer composition suitable for pipe applications prepared via solution polymerization process, and pipes made therefrom. The ethylene/alpha-olefin interpolymer composition suitable for pipe applications according to the present invention comprises greater than 80 percent by weight of units derived from ethylene and 20 percent or less by weight of units derived from one or more alpha olefin co-monomers, wherein said ethylene/alpha-olefin interpolymer has a density in the range of from 0.925 to 0.935 g/cm$^3$, a melt index $I_2$ in the range of from 0.3 to 1.0 g/10 minutes, a melt flow ratio $I_{10}/I_2$ in the range of from 7.9 to 11, a melt strength in the range of from 3 to 10 cN, a DSC heat curve having a melting peak temperature in the range of from 120 to 130° C., a crystallinity in the range of from 50 to 70 percent, a 1% flexural modulus in the range from 350 to 600 MPa, and a zero shear viscosity ratio (ZSVR) in the range of from 2 to 10.

Ethylene/α-Olefin Interpolymer Composition

The ethylene/α-olefin interpolymer composition comprises (a) less than or equal to 100 percent, for example, at least 80 percent, or at least 90 percent, of the units derived from ethylene; and (b) less than 20 percent, for example, less than 15 percent, less than 10 percent, or less than 8 percent, by weight, of units derived from one or more α-olefin comonomers. All subranges and individual values are included and disclosed herein. For example, in some embodiments, the ethylene/α-olefin interpolymer composition comprises from greater than 0 percent to less than 20 percent, 1 percent to 10 percent, or 2 percent to 8 percent, by weight, of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene/α-olefin interpolymer composition has a density in the range of 0.925 to 0.935 g/cm$^3$, for example from 0.925 to 0.932 g/cm$^3$. For example, the density can be from a lower limit of 0.925, 0.927, or 0.928 g/cm$^3$ to an upper limit of 0.932, 0.934, or 0.935 g/cm$^3$.

The ethylene/α-olefin interpolymer composition has a molecular weight distribution ($M_w/M_n$) in the range of from 2.0 to 4.0. For example, the molecular weight distribution ($M_w/M_n$) can be from a lower limit of 2.0, 2.5, or 2.7 to an upper limit of 3.7, 3.8, or 4.0.

The ethylene/α-olefin interpolymer composition has a melt index ($I_2$ at 190° C./2.16 kg) in the range of from 0.3 to 1.0 g/10 minutes, for example, from 0.3 to 0.9 g/10 minutes, or 0.4 to 0.8 g/10 minutes. For example, the melt index ($I_2$ at 190° C./2.16 kg) can be from a lower limit of 0.3, 0.4, or 0.5 g/10 minutes to an upper limit of 0.8, 0.9, or 1.0 g/10 minutes.

The ethylene/α-olefin interpolymer composition has melt flow ratio $I_{10}/I_2$ in the range of from 7.9 to 11, for example, from 8 to 10.5, or in the alternative from 8.0 to 10.2.

The ethylene/α-olefin interpolymer composition has a melt strength in the range of from 3 to 10 cN, for example, from 4 to 8 cN, from 4 to 7 cN.

The ethylene/α-olefin interpolymer composition has a DSC curve having a melting peak temperature in the range of from 120 to 130° C., for example, from 123 to 125° C. In some embodiments herein, the ethylene/α-olefin interpolymer composition has a DSC curve having a single melting peak temperature in the range of from 120 to 130° C. In other embodiments herein, the ethylene/α-olefin interpolymer composition has a DSC curve having a highest melting peak temperature in the range of from 120 to 130° C. In further embodiments herein, the ethylene/α-olefin interpolymer composition has a DSC curve having two melting peak temperatures, wherein the highest melting peak temperature is in the range of from 120 to 130° C. Of course, all subranges and individual values are included and disclosed in the embodiments herein.

The ethylene/α-olefin interpolymer composition has a crystallinity in the range of from 50 to 70 percent; for example, from 50 to 65 percent, or in the alternative from 55 to 60 percent.

The ethylene/α-olefin interpolymer composition has a 1% flexural modulus in the range of from 350 to 600 MPa, for example, from 375 to 575 MPa, 400 to 575 MPa, 400 to 550 MPa, 400 to 500 MPa, or 400 to 475 MPa.

The ethylene/α-olefin interpolymer composition has a zero shear viscosity ratio (ZSVR) in the range of from 2 to 10, for example, from 2 to 8, or in the alternative, from 3 to 7.

The ethylene/α-olefin interpolymer composition may further comprise additional components such as one or more additives. Such additives include, but are not limited to, antistatic agents, color enhancers, dyes, lubricants, fillers such as TiO$_2$ or CaCO$_3$, opacifiers, nucleators, processing aids, pigments, primary anti-oxidants, secondary anti-oxidants, processing aids, UV stabilizers, anti-blocks, slip agents, tackifiers, fire retardants, anti-microbial agents, odor reducer agents, anti-fungal agents, and combinations thereof. The ethylene-based polymer composition may contain from about 0.05 to about 10 percent by the combined weight of such additives, based on the weight of the ethylene/α-olefin interpolymer composition including such additives.

Any conventional polymerization processes may be employed to produce the ethylene/α-olefin interpolymer composition. Such conventional polymerization processes include, but are not limited to, solution polymerization process, using one or more conventional reactors e.g. loop reactors, isothermal reactors, stirred tank reactors, batch reactors in parallel, series, and/or any combinations thereof.

The ethylene/α-olefin interpolymer composition may, for example, be produced via solution phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 115 to 250° C.; for example, from 115 to 200° C., and at pressures in the range of from 300 to 1000 psi; for example, from 400 to 750 psi. In one embodiment in a dual reactor, the temperature in the first reactor temperature is in the range of from 115 to 190° C., for example, from 115 to 150° C., and the second reactor temperature is in the range of 150 to 200° C., for example, from 170 to 195° C. In another embodiment in a single reactor, the temperature in the reactor temperature is in the range of from 115 to 190° C., for example, from 115 to 150° C. The residence time in a solution phase polymerization process is typically in the range of from 2 to 30 minutes; for example, from 10 to 20 minutes. Ethylene, solvent, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Tex. The resultant mixture of the ethylene/alpha-olefin interpolymer composition and solvent is then removed from the reactor and the ethylene/alpha-olefin interpolymer composition is isolated. Solvent is typically recovered via a solvent recovery unit, i.e. heat exchangers and vapor liquid separator drum, and is then recycled back into the polymerization system.

In one embodiment, the ethylene/α-olefin interpolymer composition may be produced via a solution polymerization process in a dual reactor system, for example a dual loop reactor system, wherein ethylene and optionally one or more α-olefins are polymerized in the presence of one or more catalyst systems. Additionally, one or more cocatalysts may be present.

In another embodiment, the ethylene/alpha-olefin interpolymer composition may be produced via a solution polymerization process in a single reactor system, for example a single loop reactor system, wherein ethylene and optionally one or more α-olefins are polymerized in the presence of one or more catalyst systems. Additionally, one or more cocatalysts may be present.

End Use Applications

The ethylene/alpha-olefin interpolymer composition according to the present invention can be formed into pipes and used for conveying hot and/or cold water under pressure for under-floor heating purposes as well as other industrial pipe applications. The inventive ethylene/alpha-olefin interpolymer composition may be formed into pipes via, for example, an extrusion process; thus forming single layer pipes or multilayer pipes. Such pipes may further be reinforced, for example, via other layers, e.g. metal layers. The pipes according to the present invention have a diameter in the range of from 5 to 50 mm. The pipes according to the present invention have a wall thickness in the range of from 0.5 to 10 mm.

EXAMPLES

The following examples illustrate the present invention but are not intended to limit the scope of the invention. The examples of the instant invention demonstrate that the ethylene/alpha-olefin interpolymer compositions of the present invention provide acceptable hoop stress resistance and acceptable slow crack growth resistance while having improved flexibility thus facilitating the expeditious installations of such pipes.

Production of Comparative Examples

Comparative Examples A and B (CE-A, CE-B) are prepared according to the following process in a single reactor according to the conditions reported in Table 1.

All raw materials (ethylene, 1-octene) and the process solvent (a narrow boiling range high-purity isoparaffinic solvent, commercially available under the trade name Shellsol SBP100-140 from SHELL) are purified with molecular sieves before introduction into the reaction environment. High purity hydrogen is supplied by a shared pipeline; it is mechanically pressurized to above reaction pressure at 50 barg prior to delivery to the reactors; any potential residual moisture is removed via molecular sieve 3 A. The reactor monomer feed (ethylene) streams are pressurized via mechanical compressor to above reaction pressure at 28 barg. The solvent feeds are mechanically pressurized to above reaction pressure at 28 barg. The comonomer (1-octene) feed is also mechanically pressurized to above reaction pressure at 28 barg and is injected directly into the combined feed stream for the reactor(s). Two catalyst components are injected into the reactor (Ziegler-Natta premix, and triethylaluminum (TEA)). All catalyst components are independently mechanically pressurized to above reaction pressure at 28 barg. All reactor catalyst feed flows are measured with mass flow meters and independently controlled with positive displacement metering pumps.

The continuous solution polymerization reactors consist of two liquid full, continuous stirrer reactors (CSTR), and independently controlled operating in a series configuration. Only the first reactor is used to produce Comparative Examples A and B (CE-A, CE-B). Each reactor has independent control of all fresh solvent, monomer, comonomer, hydrogen, and catalyst component feeds. The combined solvent, monomer, comonomer and hydrogen feed to each reactor is independently temperature controlled to anywhere between 0° C. to 30° C. and typically 15° C. by passing the feed stream through a series of heat exchangers. The fresh comonomer feed to the polymerization reactors can be aligned to add comonomer to one of three choices: the first reactor, the second reactor, or the common solvent where it is then split between both reactors proportionate to the shared solvent feed split. For making Comparative Examples A and B the comonomer is fed only to the first reactor. The fresh feed to the polymerization reactor is injected into the reactor at the bottom. The catalyst components (Ziegler-Natta premix and TEA) are injected into the polymerization reactor through specially designed injection stingers and are each separately injected into the same relative location in the reactor with no contact time prior to the reactor.

The primary catalyst component feed to the reactor (a Ziegler-Natta premix) is computer controlled to maintain the reactor monomer concentration at a specified target (i.e. ethylene conversion). The cocatalyst component (TEA) is fed based on calculated specified molar ratios to the primary catalyst component. Immediately following each fresh injection location (either feed or catalyst), the feed streams are mixed with the circulating polymerization reactor contents with Kenics static mixing elements. The effluent from the polymerization reactor (containing solvent, monomer, comonomer, hydrogen, catalyst components, and dissolved polymer) exits the reactor and enters a zone where it is contacted with a deactivating and acid scavenging agent (typically calcium Stearate and the companying water of hydration) to stop the reaction and scavenge hydrogen chloride. The stream then goes through another set of static mixing elements to evenly disperse the water catalyst kill and any additives.

Following additive addition, the effluent (containing solvent, monomer, comonomer, hydrogen, catalyst components, and dissolved polymer) passes through a heat exchanger to raise the stream temperature in preparation for separation of the polymer from the other lower boiling reaction components. The stream then enters a two stage separation and devolatilization system where the polymer is removed from the solvent, hydrogen, and non-reacted monomer and comonomer. The polymer stream then enters a die specially designed for underwater pelletization, is cut into uniform solid pellets. The non-polymer portions removed in the devolatilization step pass through various pieces of equipment which separate most of the monomer which is removed from the system, cooled, mechanically compressed.

Additives used in Comparative Example A and B were 1250 ppm calcium stearate, 1000 ppm Irgafos 168, 250 ppm Irganox 1076, 200 ppm Irganox 1010, 2200 ppm Irganox 1330 and 1000 ppm MD1024.

Production of Inventive Examples

Inventive Examples 1 and 2 (IE-1, IE-2) are prepared according to the following process in a dual reactor configuration according to the conditions reported in Table 2.

All raw materials (ethylene, 1-octene) and the process solvent (a narrow boiling range high-purity isoparaffinic solvent, commercially available under the trade name Shellsol SBP100-140 from SHELL) are purified with molecular sieves before introduction into the reaction environment. High purity hydrogen is supplied by a shared pipeline; it is mechanically pressurized to above reaction pressure at 50 barg prior to delivery to the reactors; any potential residual moisture is removed via molecular sieve 3 A. The reactor monomer feed (ethylene) streams are pressurized via mechanical compressor to above reaction pressure at 28 barg. The solvent feeds are mechanically pressurized to above reaction pressure at 28 barg. The comonomer (1-octene) feed is also mechanically pressurized to above reaction pressure at 28 barg and is injected directly into the combined feed stream for the reactor(s). Three catalyst components are injected into the first reactor (CAT-B, RIBS-2, and MMAO-3 A, defined in Table 3). The RIBS-2 catalyst component is diluted to an optimum concentration. The CAT-B and MMAO-3A catalyst components are further batch-wise diluted to an optimum concentration with purified solvent (Isopar E) prior to injection into the reactor. Two catalyst components are injected into the second reactor (Ziegler-Natta premix, and triethylaluminum (TEA)). All catalyst components are independently mechanically pressurized to above reaction pressure at 28 barg. All reactor catalyst feed flows are measured with mass flow meters and independently controlled with positive displacement metering pumps.

The continuous solution polymerization reactors consist of two liquid full, continuous stirrer reactors (CSTR), and independently controlled operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 0° C. to 30° C. and typically 15° C. by passing the feed stream through a series of heat exchangers. The fresh comonomer feed to the polymerization reactors can be aligned to add comonomer to one of three choices: the first reactor, the second reactor, or the common solvent where it is then split between both reactors proportionate to the shared solvent feed split. In this example the comonomer is fed to both reactors. The total fresh feed to each polymerization reactor is injected into the reactor at the bottom. The catalyst components for the first reactor are injected into the polymerization reactor through specially designed injection stingers and are each separately injected into the same relative location in the first reactor with no contact time prior to the reactor. The catalyst components for the second reactor (Ziegler-Natta premix and TEA) are injected into the second polymerization reactor through specially designed injection stingers and are each injected into the same relative location in the second reactor.

The primary catalyst component feed for each reactor (CAT-B for the first reactor and a Ziegler-Natta premix for the second reactor) is computer controlled to maintain the individual reactor monomer concentration at a specified target (i.e. ethylene conversion). The cocatalyst components (RIBS-2 and MMAO-3A for the first reactor and TEA for the second reactor) are fed based on calculated specified molar ratios to the primary catalyst component. Immediately following each fresh injection location (either feed or catalyst), the feed streams are mixed with the circulating polymerization reactor contents with Kenics static mixing elements. The effluent from the first polymerization reactor (containing solvent, monomer, hydrogen, catalyst components, and dissolved polymer) exits the first reactor is injected into the second polymerization reactor of similar design. After the stream exits the second reactor it is contacted with water to stop the reaction. The stream then goes through another set of static mixing elements to evenly disperse the water catalyst kill and any additives.

Following additive addition, the effluent (containing solvent, monomer, comonomer, hydrogen, catalyst components, and dissolved polymer) passes through a heat exchanger to raise the stream temperature in preparation for separation of the polymer from the other lower boiling reaction components. The stream then enters a two stage separation and devolatization system where the polymer is removed from the solvent, hydrogen, and non-reacted monomer and comonomer. The polymer stream then enters a die specially designed for underwater pelletization, is cut into uniform solid pellets. The non-polymer portions removed in the devolatilization step pass through various pieces of equipment which separate most of the monomer which is removed from the system, cooled, mechanically compressed.

Additives used in Inventive Example 1 and 2 were 1250 ppm calcium stearate, 1000 ppm Irgafos 168, 250 ppm Irganox 1076, 200 ppm Irganox 1010, 2200 ppm Irganox 1330 and 1000 ppm Irganox MD 1024.

TABLE 1

|  | Unit | CE-A | CE-B |
| --- | --- | --- | --- |
| Reactor type |  | single CSTR | single CSTR |
| Fresh Comonomer Flow | kg/hr | 0.8 | 1.22 |
| Fresh Ethylene Flow | kg/hr | 4.71 | 4.61 |
| Solvent to Ethylene Ratio | — | 6.26 | 6.4 |
| Total Solvent Flow | kg/hr | 28.7 | 28.3 |
| Fresh Hydrogen Flow | ml/min | 25 | 23 |
| Feed Temperature | ° C. | 18 | 15 |
| Ethylene Concentration | g/L | 5.9 | 5.9 |
| Reactor Temperature | ° C. | 185 | 185 |
| Reactor log Viscosity | log (cP) | 2.5 | 2.5 |
| Reactor Polymer Concentration | wt % | 13.1 | 13.2 |
| Overall Ethylene Conversion | % | 92.5 | 92 |
| Primary Catalyst Type | — | Ziegler-Natta | Ziegler-Natta |
| Co-Catalyst Type | — | TEA | TEA |
| Co-Catalyst Molar Ratio | — | 4.5 | 4.5 |

TABLE 2

|  |  | IE-1 | IE-2 |
| --- | --- | --- | --- |
| Reactor type |  | dual CSTR in series | dual CSTR in series |
| Production Split | % | 46.8/53.2 | 53/47 |
| Primary reactor Fresh Comonomer Flow | kg/hr | 0.45 | 0.45 |
| Primary Reactor Fresh Ethylene Flow | kg/hr | 2.59 | 2.62 |
| Primary Reactor Solvent to Ethylene Ratio | — | 7.8 | 6 |
| Primary Reactor Total Solvent Flow | kg/hr | 19.7 | 15.3 |
| Primary Reactor Fresh Hydrogen Flow | ml/min | 18.5 | 28 |
| Primary Reactor Feed Temperature | ° C. | 15 | 15 |
| Secondary reactor Fresh Comonomer Flow | kg/hr | 0.48 | 0.32 |
| Secondary Reactor Fresh Ethylene Flow | kg/hr | 2.3 | 1.73 |
| Secondary Reactor Solvent to Ethylene Ratio | — | 6.3 | 6 |
| Secondary Reactor Total Solvent Flow | kg/hr | 14.6 | 10.4 |
| Secondary Reactor Fresh Hydrogen Flow | ml/min | 125 | 81 |
| Secondary Reactor Feed Temperature | ° C. | 21 | 22 |
| Primary Reactor Ethylene Concentration | g/L | 14.1 | 14.1 |
| Primary Reactor Temperature | ° C. | 147 | 147 |
| Primary Reactor log Viscosity | log (cP) | 2.5 |  |
| Primary Reactor Polymer Concentration | wt % | 10 | 12.3 |

TABLE 2-continued

|  |  | IE-1 | IE-2 |
|---|---|---|---|
| Primary Reactor Ethylene Conversion | % | 80 | 80 |
| Secondary Reactor Ethylene Concentration | g/L | 5.8 | 4.7 |
| Secondary Reactor Temperature | °C. | 185 | 185 |
| Secondary Reactor log Viscosity | log (cP) | 2.7 | |
| Secondary Reactor Polymer Concentration | wt % | 12 | 13.8 |
| Overall Ethylene Conversion | % | 92.5 | 92.5 |
| Primary Reactor Primary Catalyst Type | — | CAT-B | CAT-B |
| Primary Reactor Co-Catalyst-1 Type | — | RIBS-2 | RIBS-2 |
| Primary Reactor Co-Catalyst-1 Molar Ratio | — | 1.2 | 1.2 |
| Primary Reactor Co-Catalyst-2 Type | — | MMAO3A | MMAO3A |
| Primary Reactor Co-Catalyst-2 Molar Ratio | — | 7 | 13 |
| Secondary Reactor Primary Catalyst Type | — | Ziegler-Natta | Ziegler-Natta |
| Secondary Reactor Co-Catalyst Type | — | TEA | TEA |
| Secondary Reactor Co-Catalyst Molar Ratio | — | 4.5 | 4.5 |

TABLE 3

| Description | Chemical Name |
|---|---|
| CAT-B | Titanium, [N-(1,1-dimethylethyl)-1,1-dimethyl-1-[(1,2,3,3a,8a-η)-1,5,6,7-tetrahydro-2-methyl-s-indacen-1-yl]silanaminato(2-)-κN][(1,2,3,4-η)-1,3-pentadiene]- |
| RIBS-2 | bis(hydrogenated tallow alkyl)methyl, tetrakis(pentafluorophenyl)borate(1-) amine |
| MMAO-3A | Aluminoxanes, iso-Bu Me, branched, cyclic and linear; modified methyl aluminoxane |

Characterization of Comparative Examples and Inventive Examples

Comparative Examples A and B (CE-A, CE-B) and Inventive Examples 1 and 2 (IE-1, IE-2) were tested for their properties, and the results are reported in Table 4. Result for 1% Flexural modulus, slow crack growth resistance measured via the Pennsylvania Notch Test (PENT) under 2.4 MPa and Hoop Stress tests under various temperatures and pressures are listed in Table 5.

TABLE 4

| Resin Properties | Units | CE-A | CE-B | IE-1 | IE-2 |
|---|---|---|---|---|---|
| Density | g/cc | 0.9332 | 0.9287 | 0.9310 | 0.9319 |
| I₂ | g/10 min | 0.67 | 0.65 | 0.81 | 0.48 |
| I₁₀ | g/10 min | 5.01 | 4.92 | 8.15 | 4.83 |
| I₁₀/I₂ | | 7.5 | 7.5 | 10.0 | 10.0 |
| Mn (conv) | g/mol | 36,159 | 36,243 | 30,696 | 42,467 |
| Mw (conv) | g/mol | 135,392 | 135,985 | 109,715 | 122,947 |
| Mz (conv) | g/mol | 359,274 | 359,104 | 258,784 | 258,072 |
| Mw (conv)/Mn (conv) | | 3.74 | 3.75 | 3.57 | 2.90 |
| Mz (conv)/Mw (conv) | | 2.65 | 2.64 | 2.36 | 2.10 |
| Eta* (0.01 rad/s) | Pa · s | 12,877 | 13,024 | 24589 | 39691 |
| Eta* (0.1 rad/s) | Pa · s | 11,667 | 11,863 | 16078 | 24188 |
| Eta* (1.0 rad/s) | Pa · s | 9,099 | 9,247 | 7859 | 11187 |
| Eta* (10 rad/s) | Pa · s | 5,374 | 5,405 | 3601 | 5045 |
| Eta* (100 rad/s) | Pa · s | 2,081 | 2,064 | 1412 | 1928 |
| Zero shear viscosity | Pa · s | 13765 | 14461 | 30469 | 51361 |
| ZSVR | | 1.12 | 1.16 | 5.33 | 5.93 |
| Melt strength | cN | 4.7 | 4.6 | 4.9 | 6.4 |
| Tm | °C. | 124.7 | 123.3 | 123.1 | 124 |
| Tc | °C. | 111.8 | 109.8 | 110.3 | 111.9 |
| Heat of fusion | J/g | 174.6 | 171.3 | 169.9 | 172.8 |
| Crystallinity | % | 59.8 | 58.7 | 58.2 | 59.2 |

TABLE 5

| | Units | CE-A | CE-B | IE-1 | IE-2 |
|---|---|---|---|---|---|
| 1% Flexural Modulus | MPa | 483 | 402 | 418 | 439 |
| PENT @ 2.4 MPa | hours | >6300 | 3990 | >6300 | >6300 |
| Hoop stress @ 95° C., 3.4 MPa | hours | >4100 | <1 | >4100 | >4100 |
| Hoop stress @ 95° C., 3.6 MPa | hours | >1400 | NM | >2400 | >2800 |
| Hoop stress @ 95° C., 3.8 MPa | hours | NM | NM | 1125 | >2400 |
| Hoop stress @ 20° C., 9.9 MPa | hours | >200 | 17 | >500 | >500 |

Test Methods

Test methods include the following:

Density

Samples for density measurements were prepared according to ASTM D 4703-10.

Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index

Melt index (I$_2$), was measured in accordance with ASTM D 1238-10, Condition 190° C./2.16 kg, Method B, and was reported in grams eluted per 10 minutes.

Melt index (I$_{10}$) was measured in accordance with ASTM D 1238-10, Condition 190° C./10 kg, Method B, and was reported in grams eluted per 10 minutes.

Dynamic Mechanical Spectroscopy (DMS)

Resins were compression-molded into "3 mm thick×1 inch" circular plaques at 350° F., for five minutes, under 1500 psi pressure, in air. The sample was then taken out of the press, and placed on a counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of "2 mm," the sample trimmed (extra sample that extends beyond the circumference of the "25 mm diameter" plate was removed), and then the test was started. The method had an additional five minute delay built in, to allow for temperature equilibrium. The experiments were performed at 190° C. over a frequency range of 0.1 to 100 rad/s. The strain amplitude was constant at 10%. The complex viscosity $\eta^*$, tan ($\delta$) or tan delta, viscosity at 0.1 rad/s (V0.1), the viscosity at 100 rad/s (V100), and the viscosity ratio (V0.1/V100) were calculated from these data.

Melt Strength

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Gel Permeation Chromatography (GPC)

Samples were analyzed with a high-temperature GPC instrument (model PL220, Polymer Laboratories, Inc., now Agilent). Conventional GPC measurements were used to determine the weight-average molecular weight (Mw) and number-average molecular weight (Mn) of the polymer and to determine the molecular weight distribution, MWD or Mw/Mn. The z-average molecular weight, Mz, was also determined. The method employed the well-known universal calibration method based on the concept of hydrodynamic volume, and the calibration was performed using narrow polystyrene (PS) standards along with three 10 μm Mixed-B columns (Polymer Laboratories Inc, now Agilent) operating at a system temperature of 140° C. Polyethylene samples were prepared at a 2 mg/mL concentration in 1,2,4-trichlorobenzene solvent by slowly stifling the sample in TCB at 160° C. for 4 hours. The flow rate was 1.0 mL/min, and the injection size was 200 microliters. The chromatographic solvent and the sample preparation solvent contained 200 ppm of butylated hydroxytoluene (BHT). Both solvent sources were nitrogen sparged. The molecular weights of the polystyrene standards were converted to polyethylene equivalent molecular weights using a correction factor of 0.4316 as discussed in the literature (T. Williams and I. M. Ward, *Polym. Letters*, 6, 621-624 (1968)). A third order polynomial was used to fit the respective polyethylene-equivalent molecular weights of standards to the observed elution volumes.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of 10$^{-3}$ to 10$^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of $\epsilon$ vs. t, where $\epsilon$ is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.;

Reichek, Kenneth N. Detection of low levels of long-chain branching in polyolefins. Annual Technical Conference—Society of Plastics Engineers (2008), 66th, 887-891.

Differential Scanning Calorimetry (DSC)

Differential Scanning calorimetry (DSC) was used to measure the melting and crystallization behavior of a polymer over a wide range of temperatures. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at about 175° C.; the melted sample was then air-cooled to room temperature (approx. 25° C.). The film sample was formed by pressing a "0.1 to 0.2 gram" sample at 175° C. at 1,500 psi, and 30 seconds, to form a "0.1 to 0.2 mil thick" film. A 3-10 mg, 6 mm diameter specimen was extracted from the cooled polymer, weighed, placed in a light aluminum pan (ca 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves were recorded. The cool curve was analyzed by setting baseline endpoints from the beginning of crystallization to −20° C. The heat curve was analyzed by setting baseline endpoints from −20° C. to the end of melt. The values determined were peak melting temperature ($T_m$), peak crystallization temperature ($T_c$), heat of fusion ($H_f$) (in Joules per gram), and the calculated % crystallinity for polyethylene samples using: % Crystallinity=(($H_f$)/(292 J/g))×100. The heat of fusion ($H_f$) and the peak melting temperature were reported from the second heat curve. Peak crystallization temperature is determined from the cooling curve. Referring to FIG. 1, a second heating DSC curve is depicted, which shows a single melting peak temperature for inventive examples 1 and 2 of 123.1° C. and 124° C., respectively.

Pipe Extrusion

Pipes are produced with a Cincinnati Proton extruder (45 mm bather screw of 28 L/D), with a Graewe V63-2-6 cooling unit. Pipes were extruded with a temperature profile of 195-210-220-220° C. in the four zones of the extruder, and at 230° C. at all die zones. The line speed is 5 m/min. Pipes produced via the above method have an outer diameter of 20 mm and a wall thickness of 2 mm.

Hoop Stress Testing

Hoop stress testing is performed at various temperatures and pressures according to ISO 1167 using the pipes produced via the method described above.

Flexural Modulus

Flexural modulus is measured according to ASTM D790. Flexural modulus at 1% strain is reported in Table 5.

PENT

PENT is measured according to ASTM D3350 at 80° C. and under 2.4 MPa stress.

The present invention may be embodied in other forms without departing from the spirit and the essential attributes thereof, and, accordingly, reference should be made to the appended claims, rather than to the foregoing specification, as indicating the scope of the invention.

The invention claimed is:

1. An ethylene/alpha-olefin interpolymer composition suitable for pipe applications prepared via solution polymerization process comprising greater than 80 percent by weight of units derived from ethylene and 20 percent or less by weight of units derived from one or more alpha olefin co-monomers, wherein said ethylene/alpha-olefin interpolymer has a density in the range of from 0.925 to 0.935 g/cm$^3$, a melt index $I_2$ in the range of from 0.3 to 1.0 g/10 minutes, a melt flow ratio $I_{10}/I_2$ in the range of from 7.9 to 11, a melt strength in the range of from 3 to 10 cN, a DSC heat curve having a melting peak temperature in the range of from 120 to 130° C., a crystallinity in the range of from 50 to 70 percent, a 1% flexural modulus in the range from 350 to 600 MPa, and a zero shear viscosity ratio (ZSVR) in the range of from 2 to 10.

2. The ethylene/alpha-olefin interpolymer composition suitable for pipe applications according to claim 1, wherein said ethylene/alpha-olefin interpolymer composition further comprises one or more additives.

3. A pipe comprising the ethylene/alpha-olefin interpolymer composition according to claim 1.

4. The pipe of claim 3, wherein the pipe is a monolayer pipe.

5. The pipe of claim 3, wherein said ethylene/alpha-olefin interpolymer composition has a time to failure at 95° C. and 3.4 MPa of at least 1000 h determined according to ISO 1167.

* * * * *